(12) United States Patent
Kim (10) Patent No.: US 7,533,650 B2
(45) Date of Patent: May 19, 2009

(54) EMISSION CONTROL FOR AN INTERNAL COMBUSTION ENGINE

(75) Inventor: Charlie Chang-Won Kim, Cedar Falls, IA (US)

(73) Assignee: Mack Trucks, Inc., Allentown, PA (US)

( * ) Notice: Subject to any disclaimer, the term of this patent is extended or adjusted under 35 U.S.C. 154(b) by 473 days.

(21) Appl. No.: 11/547,268

(22) PCT Filed: Mar. 28, 2005

(86) PCT No.: PCT/US2005/010321

§ 371 (c)(1),
(2), (4) Date: Oct. 4, 2006

(87) PCT Pub. No.: WO2005/099364

PCT Pub. Date: Oct. 27, 2005

(65) Prior Publication Data

US 2008/0283022 A1      Nov. 20, 2008

Related U.S. Application Data (60) Provisional application No. 60/559,974, filed on Apr. 7, 2004.

(51) Int. Cl.
*F02B 3/12* (2006.01)
(52) U.S. Cl. .................. 123/300; 123/294; 123/305; 123/435; 701/104
(58) Field of Classification Search ................ 123/294, 123/295, 299, 300, 305, 435; 701/105
See application file for complete search history.

(56) References Cited

U.S. PATENT DOCUMENTS

| | | | |
|---|---|---|---|
| 3,894,520 A | 7/1975 | Clawson | |
| 4,033,302 A | 7/1977 | Jarnuszkiewicz | |
| 4,716,877 A | 1/1988 | Duret | |
| 4,748,949 A | 6/1988 | Steiger et al. | |
| 5,467,757 A | 11/1995 | Yanagihara et al. | |
| 6,125,796 A | 10/2000 | Coleman | |
| 6,182,632 B1 | 2/2001 | Yanagihara | |
| 6,302,080 B1 | 10/2001 | Kato et al. | |
| 6,378,487 B1 | 4/2002 | Zubouski et al. | |
| 6,386,177 B2 | 5/2002 | Urushihara et al. | |
| 6,439,211 B1 | 8/2002 | Juretzka et al. | |
| 6,470,849 B1 | 10/2002 | Duffy et al. | |
| 6,505,601 B1 | 1/2003 | Jorach et al. | |
| 6,516,773 B2 | 2/2003 | Dutart et al. | |
| 6,516,774 B2 | 2/2003 | zur Loye et al. | |
| 6,543,411 B2 | 4/2003 | Raab et al. | |

(Continued)

*Primary Examiner*—Erick Solis
(74) *Attorney, Agent, or Firm*—Martin Farrell (57) ABSTRACT

An internal combustion cylinder assembly includes a cylinder having a cylinder head at an end thereof, a combustion chamber disposed in the cylinder head, a piston disposed slidably within the cylinder, the piston having a bottom dead center position distal from the combustion chamber and a top dead center position proximate to the combustion chamber, a pilot quantity of fuel disposed substantially dispersably within the cylinder, a working fluid disposed compressably within the cylinder, the piston compressing the working fluid and the pilot quantity of fuel as it slides from the bottom dead center position to the top dead center position, and wherein the pilot quantity of fuel is substantially a maximum quantity that will not support auto-ignition when the working fluid and the pilot quantity of fuel have been compressed.

23 Claims, 6 Drawing Sheets

U.S. PATENT DOCUMENTS

| | | |
|---|---|---|
| 6,561,157 B2 | 5/2003 | zur Loye et al. |
| 7,398,743 B2 * | 7/2008 | Fiveland ........................ 123/3 |
| 7,400,966 B2 * | 7/2008 | Strom et al. ................. 701/104 |
| 2002/0053336 A1 | 5/2002 | Nogi et al. |
| 2002/0100458 A1 | 8/2002 | Hafner et al. |
| 2003/0029417 A1 | 2/2003 | Zimmermann et al. |
| 2003/0070650 A1 | 4/2003 | Ishikawa et al. |
| 2003/0089332 A1 | 5/2003 | Yomogida |
| 2003/0089333 A1 | 5/2003 | Duffy et al. |

* cited by examiner

EMISSION CONTROL FOR AN INTERNAL COMBUSTION ENGINE

CROSS-REFERENCE TO RELATED APPLICATIONS

This application is a National Phase of International Application Serial No. PCT/US2005/010321, filed 28 Mar. 2005, which claims priority of U.S. Provisional Application Ser. No. 60/559,974, filed 7 Apr. 2004.

BACKGROUND OF THE INVENTION

1. Field of the Invention

The invention relates to internal combustion engines, and in particular, to homogenous charge compression ignition (HCCI) engines.

2. Description of the Related Art

Emission control standards for internal combustion engines have tended to become more stringent over time. The sorts of emissions to be controlled tend to fall into at least four broad categories: unburned hydrocarbons, carbon monoxide, particulates, and oxides of nitrogen (NOx).

Unburned hydrocarbons and carbon monoxide tend to be products of incomplete combustion of a hydrocarbon fuel. Each atom of carbon in the fuel requires two atoms of oxygen with which to combine for complete combustion. If each carbon atom finds two oxygen atoms with which to combine, carbon dioxide is formed. The remaining hydrogen atoms combine with two oxygen atoms apiece to form water.

If only one atom of oxygen is available to combine with a carbon atom, on the other hand, carbon monoxide is formed. If no oxygen is available, hydrocarbons are left unburned. Thus, reduction of unburned hydrocarbons and carbon monoxide depends on the provision of adequate oxygen and temperature during combustion to oxidize the carbon atoms completely.

Compression ignition engines are generally run with an excess of air over the stoichiometric ratio to ensure adequate oxygen supplies are available for combustion. Particulates tend to be produced by reactions that are close to stoichiometric as well, so the availability of an excess of oxygen over stoichiometric may reduce those as well.

Nitrogen is a major component of air. Nitrogen is inert at standard temperature and pressure. Nitrogen becomes reactive, however, at heightened temperatures and pressures. The heat associated with high temperatures thus serves as a catalyst for nitrogen. High temperatures tend to be associated with complete combustion, since combustion is exothermic. Nitrogen will thus react with oxygen at the high temperatures associated with complete combustion, forming oxides of nitrogen.

One way to control the production of oxides of nitrogen is to limit the combustion chamber temperatures reached during combustion. Since heat associated with high combustion temperatures serves as a catalyst for nitrogen, reducing the peak combustion chamber temperature may reduce the reactivity of nitrogen. Since reducing the peak temperature ameliorates one of the conditions necessary for the production of oxides of nitrogen, there may be a consequent reduction in the quantity of oxides of nitrogen that are produced.

Fuel is injected, on the average, into the center of a combustion chamber in a conventional compression-ignition engine. The fuel is injected after the incoming air charge has been compressed sufficiently to ignite the fuel, and thus the fuel burns almost immediately. Since the fuel burns almost immediately, it has relatively little time to distribute itself evenly about the combustion chamber. Since the fuel is not distributed evenly during combustion, but rather is localized, a large quantity of fuel is available in a small volume to support combustion. Since a large quantity of fuel is available to support combustion, combustion proceeds for a relatively long period of time, and high temperatures of combustion are able to develop.

With HCCI engines, on the other hand, fuel is injected during the intake stroke or the compression stroke. The fuel thus has some time to propagate throughout the volume of the combustion chamber before combustion takes place. The combustion event occurs once the air charge has been compressed enough to raise its temperature to the kindling temperature of the fuel. Furthermore, the swirling and tumbling of the air charge during intake or compression may promote distribution of the fuel before the combustion event takes place.

Since the fuel has time to propagate throughout the combustion chamber volume before ignition takes place, ignition may occur simultaneously throughout the combustion chamber volume. This may, for example, allow the combustion process to rely less on propagation of a flame front to burn the fuel than would be the case with conventional compression ignition.

The combustion rate may also be higher, since there will be no delay associated with waiting for a flame front to progress across the combustion chamber. This may allow a more dilute mixture of air and fuel to be used. This may also allow the peak temperature to be reduced, thereby reducing formation of oxides of nitrogen, since the fuel burns completely in less time than it would take for comparable localized combustion. This may allow the combustion process to take place at lower temperatures than it would were the fuel more concentrated.

Since most of the expansion in an HCCI engine occurs once there is sufficient fuel available to auto-ignite and the air charge has been compressed enough to raise its temperature to the kindling temperature of the fuel, the timing of the expansion event may vary somewhat from cycle to cycle. The timing of the expansion event in an HCCI engine may thus be relatively more difficult to control than the timing of the expansion event in a conventional compression ignition engine. Variability of expansion timing may manifest itself as roughness or pre-detonation, also known as "knocking."

Combustion may proceed in stages. Combustion of diesel fuel, for example, may be characterized by different reactions at different temperatures. The temperatures associated with combustion may vary over time. Since the character of a reaction may depend on the temperature at which it occurs, the reactions may vary over time as well.

Many of the constituents of diesel fuel exhibit a molecular structure similar to n-heptane ($C_7H_{16}$). The chemical kinetics of oxidation of n-heptane may start with hydrogen being extracted from $C_7H_{16}$ as shown below:

$$C_7H_{16} + O_2 = C_7H_{15}* + HO_2*$$

$$C_7H_{16} + OH* = C_7H_{15}* + H_2O$$

$$C_7H_{16} + HO_2* = C_7H_{15}* + H_2O_2$$

There are two possible reactions for $C_7H_{15}*$ and $O_2$. The first reaction, known as "cool flame combustion", occurs at temperatures below about 1000 K. This reaction may be characterized as $C_7H_{15}* + O_2 = C_7H_{15}OO*$. Cool flame combustion dominates the combustion process while temperatures remain below about 1000 K, and produces $C_7H_{15}OO*$.

This reaction may be followed by an isomerization reaction in which $C_7H_{15}OO*$ is converted to $*C_7H_{14}OOH$, or:

$C_7H_{15}OO^* = {}^*C_7H_{14}OOH$. If an oxygen molecule is added to $^*C_7H_{14}OOH$, an oxohydroperoxide radical ($OOC_7H_{14}OOH$) may be produced. The oxohydroperoxide radical may then isomerize further and decompose into a relatively stable keto-hydroperoxide species and $OH^*$.

Thus, numerous $OH^*$ radicals may be formed during cool flame combustion. A significant amount of carbon monoxide (CO) may be formed during cool flame combustion as well. In addition, water ($H_2O$) forms as a result of $C_7H_{16}$ reacting with $OH^*$, or $C_7H_{16}+OH^*=C_7H_{15}^*+H_2O$. This reaction is highly exothermic and proceeds quickly.

The second reaction of $C_7H_{15}^*$ and $O_2$ results from "auto-ignition", and takes place at temperatures above about 1000 K. This reaction may be characterized as $C_7H_{15}^* + O_2 = C_7H_{14} + HO_2^*$. The temperature of the mixture may rise as hydrogen is extracted from the n-heptane. If the temperature rises above about 1000 K, $H_2O_2$ may decompose into two hydroxyl radical $OH^*$ molecules via a chain branching step: $H_2O_2+M=OH^*+OH^*+M$.

One of the factors that determines whether combustion temperatures rise above 1000 K is the availability of fuel. Cool flame combustion may be maintained indefinitely in the absence of sufficient fuel to support auto-ignition, other things being equal. If, however, fuel sufficient to support auto-ignition becomes available after the onset of cool flame combustion, auto-ignition may commence, and temperatures may rise above 1000 K, possibly reaching 1400 K to 1500K. Combustion at temperatures above 1000 K may be more complete, and further extraction of hydrogen from $C_7H_{16}$ may result in the conversion of the remaining $OH^*$ radicals to $H_2O$, and CO to $CO_2$. The higher temperatures, however, may result in more oxidation of nitrogen as well.

If, however, some cool flame combustion has taken place beforehand, the presence of leftover carbon dioxide ($CO_2$) and water ($H_2O$) may quench combustion somewhat in the manner of internal exhaust gas recirculation (EGR). Internal EGR may thus lower flame temperatures and limit production of NOx just like conventional EGR once auto-ignition has taken place.

Furthermore, excess $OH^*$ radicals present during auto-ignition may result in quick production of $C_7H_{15}^*$ and its decomposition at higher temperatures. Finally, hydrogen may be extracted from a significant amount of the fuel injected during the main injection event having due to the presence of OH radicals, resulting in lower soot formation.

SUMMARY OF THE INVENTION

In a first aspect of the invention, an internal combustion cylinder assembly includes a cylinder having a cylinder head at an end thereof, a combustion chamber disposed in the cylinder head, a piston disposed slidably within the cylinder, the piston having a bottom dead center position distal from the combustion chamber and a top dead center position proximate to the combustion chamber, a pilot quantity of fuel disposed substantially dispersably within the cylinder, a working fluid disposed compressably within the cylinder, the piston compressing the working fluid and the pilot quantity of fuel as it slides from the bottom dead center position to the top dead center position, and wherein the pilot quantity of fuel is substantially a maximum quantity that will not support auto-ignition when the working fluid and the pilot quantity of fuel have been compressed.

In a second aspect of the invention, a method of controlling emissions in an internal combustion engine includes transferring a working fluid to a cylinder, dispersing a maximum pilot quantity of fuel that will not support auto-ignition when the working fluid and the pilot quantity of fuel have been compressed in the cylinder, and compressing the working fluid and the pilot quantity of fuel.

In a third aspect of the invention, a system of controlling emissions in an internal combustion engine includes means for transferring a working fluid to a cylinder, means for dispersing a maximum pilot quantity of fuel that will not support auto-ignition when the working fluid and the pilot quantity of fuel have been compressed in the cylinder, and means for compressing the working fluid and the pilot quantity of fuel.

DETAILED DESCRIPTION OF THE PREFERRED EMBODIMENTS

Since lower flame temperatures limit production of NOx, it would be desirable for lower flame temperatures to persist after auto-ignition. Since $CO_2$ and $H_2O$ quench combustion somewhat, thus lowering flame temperatures, it would be desirable for $CO_2$ and $H_2O$ to be available after auto-ignition. Since cool flame combustion results in formulation of CO and $H_2O$, it would be desirable for cool flame combustion to occur before auto-ignition.

Since the quantity of CO and $H_2O$ produced during cool flame combustion is generally proportional to the quantity of fuel subject to cool flame combustion, it would be desirable for the maximum quantity of fuel that will not trigger auto-ignition to be available during cool flame combustion. Finally, it would be desirable for auto-ignition combustion to commence substantially at top dead center, or slightly in advance of top dead center to allow for the flame front to propagate, so that pre-detonation is minimized.

Since it would be desirable for auto-ignition combustion to commence substantially at top dead center, it would be desirable for the moment at which auto-ignition occurs to be controllable. In particular, since auto-ignition occurs once there is sufficient fuel available to auto-ignite and the air charge reaches the kindling temperature of the fuel, it would be desirable it the moment at which fuel sufficient to produce auto-ignition becomes available were precisely controllable.

The timing of the occurrence of auto-ignition may depend, inter alia on the quantity of fuel available, the initial temperature and pressure of the air charge, the effective compression ratio of the engine, the piston speed, and the heat transfer characteristics of the materials surrounding the combustion chamber. Each of these factors may vary as the operating conditions of the engine, vary. It would be desirable for the occurrence of auto-ignition in an HCCI engine to be more precisely controllable to help compensate for these variables.

Although the embodiments of the invention described herein are described in the context of an HCCI engine, the concept of the invention could be applied to other types of ignition as well, such as, e.g. a conventional compression-ignited engine or a spark-, hotbulb- or glowplug-ignited engine. Furthermore, although the embodiments of the invention are described in the context of a four-cycle engine, the principle of the invention may be applied to a two-stroke engine as well.

Figure 1:
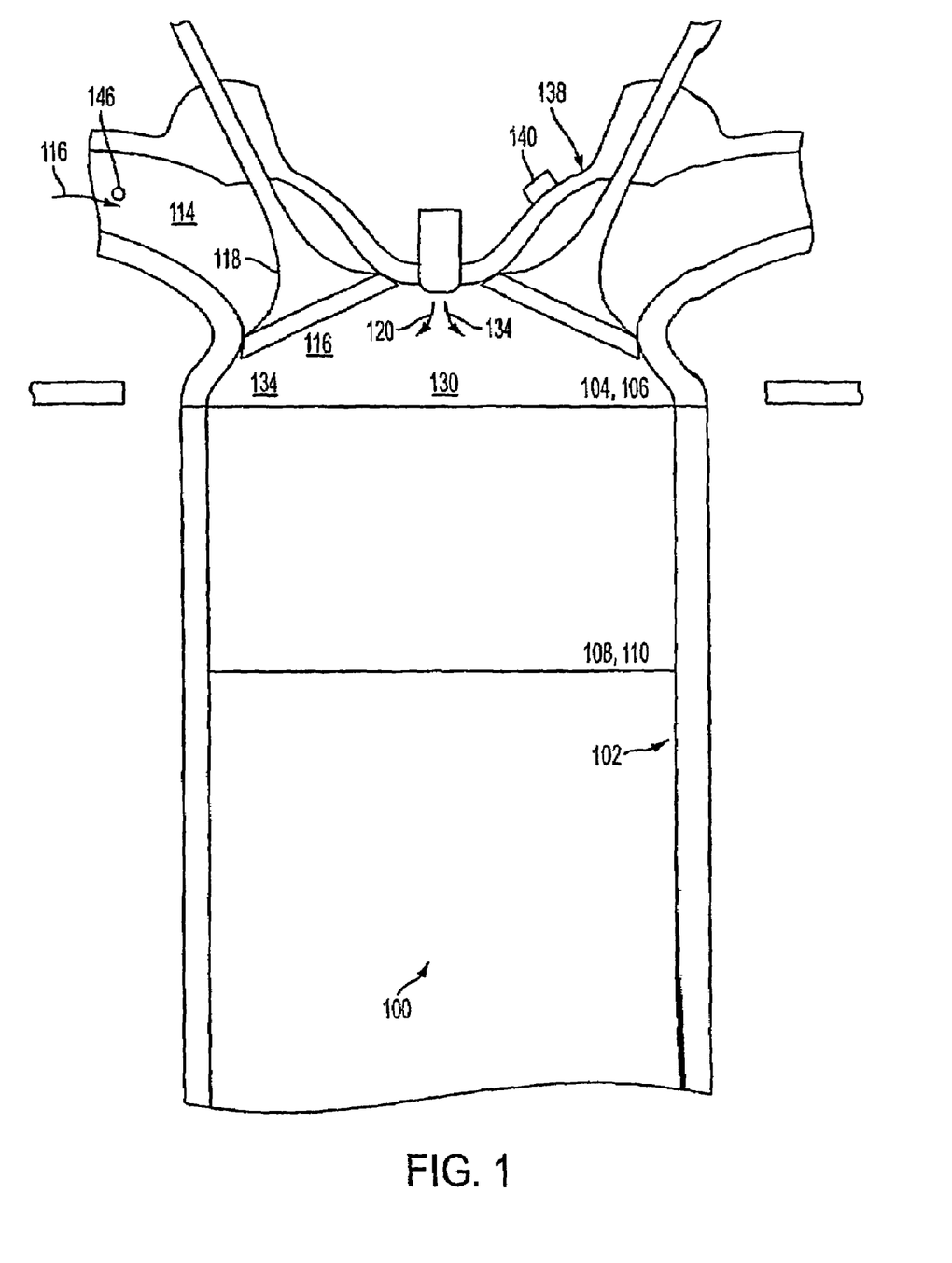
FIG. 1 is emission control for an internal combustion engine according to a first embodiment of the invention.
Figure 2:
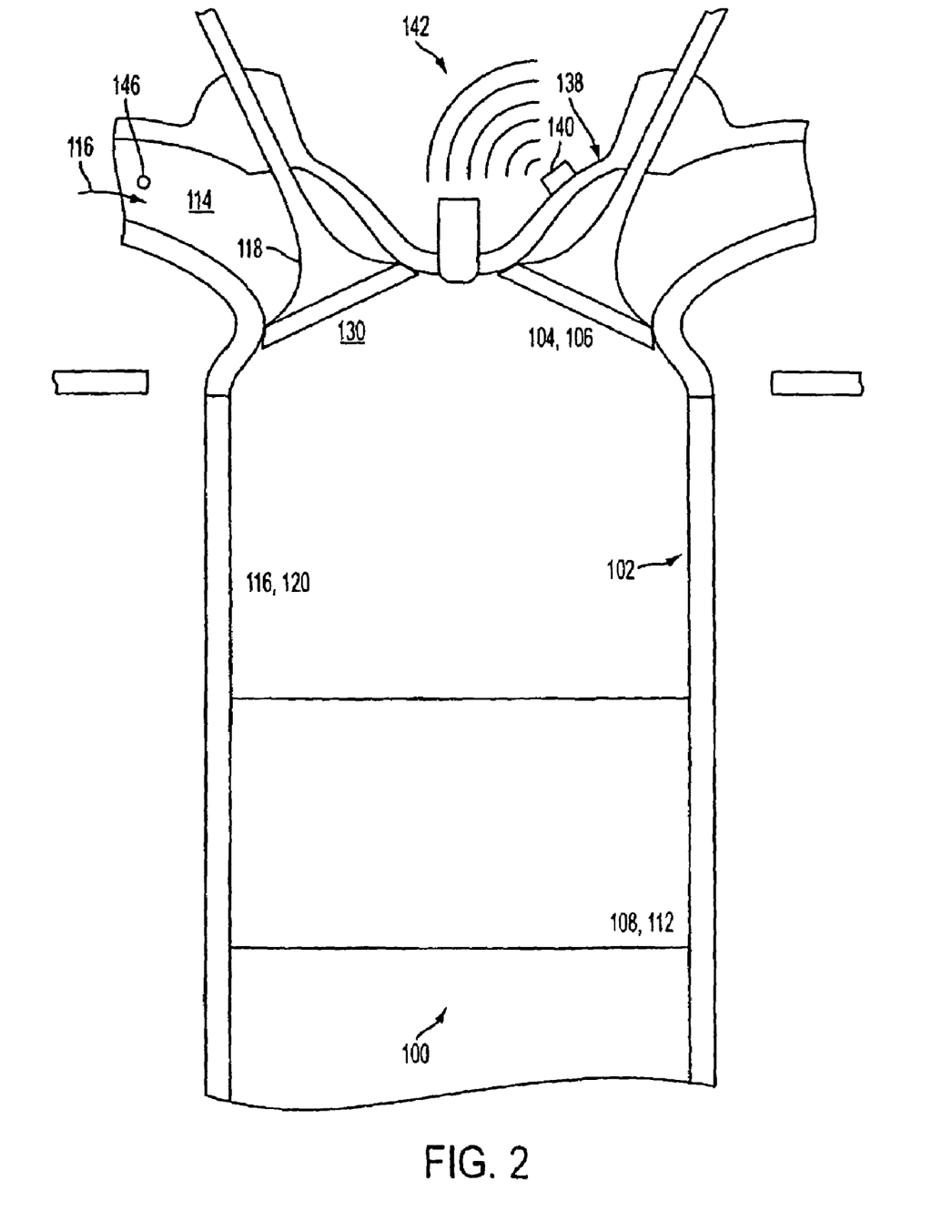
FIG. 2 is an alternate view of the embodiment shown in FIG. 1.

In FIGS. 1 and 2 is shown an internal combustion cylinder assembly 100 according to a first embodiment of the invention. Cylinder assembly 100 includes a cylinder 102 having a combustion chamber 104 at an end 106 thereof and a piston 108 disposed slidably within cylinder 102. Piston 108 may have a top dead center position 110 proximate to combustion chamber 104 and a bottom dead center position 112 distal from combustion chamber 104.

In one embodiment, an intake runner 114 may be connected communicably to combustion chamber 104 via an intake valve 118. In this embodiment, intake runner 114 may provide a working fluid 116 to cylinder 102 when intake valve 118 is substantially open and piston 108 moves from top dead center position 110 to bottom dead center position 112. Working fluid 116 may be, e.g. air, such as a mixture of nitrogen, oxygen, carbon dioxide, water vapor, and trace elements such as argon.

A pilot quantity of fuel 120 may be transferred to cylinder 102. In one embodiment, pilot quantity of fuel 120 may be dispersed in working fluid 116. In one embodiment, pilot quantity of fuel 120 is substantially equal to the maximum quantity of fuel that will not support auto-ignition.

In one embodiment, pilot quantity of fuel 120 is injected into combustion chamber 104. In one embodiment, pilot quantity of fuel 120 is injected into combustion chamber 104 when piston 108 is substantially 50 degrees before top dead center. In another embodiment, a second pilot quantity of fuel is injected into combustion chamber 104 30 to 40 crank angle degrees before pilot quantity of fuel 120 is injected. This embodiment may, for example, increase the presence of hydrocarbons (HC) and CO in the exhaust gases for exhaust aftertreatment devices.

Working fluid 116 and pilot quantity of fuel 120 may be compressed if intake valve 118 is substantially closed and piston 108 moves from bottom dead center position 112 to top dead center position 110. In one embodiment, a temperature of pilot quantity of fuel 120 mixed with working fluid 116 may rise above its kindling temperature while it is being compressed.

If pilot quantity of fuel 120 is substantially equal to the maximum quantity of fuel that will not support auto-ignition, cool flame combustion may take place when pilot quantity of fuel 120 reaches its kindling temperature. If pilot quantity of fuel 120 were dispersed substantially within cylinder 102, a combustion of pilot quantity of fuel 120 may proceed without the temperature of working fluid 116 rising high enough to promote excessive oxidation of nitrogen.

In another embodiment, pilot quantity of fuel 120 is almost large enough to support auto-ignition. In this embodiment, a main quantity of fuel 134 may make up the difference between the volume of pilot quantity of fuel 120 and the volume of fuel necessary to support auto-ignition. In another embodiment, main quantity of fuel 134 may be larger than necessary to make up the difference between the volume of pilot quantity of fuel 120 and the volume of fuel necessary to support auto-ignition.

In one embodiment, main quantity of fuel 134 may be injected into cylinder 102 when piston 108 is substantially at top dead center position 110. In another embodiment, main quantity of fuel 134 may be injected into cylinder 102 before piston 108 is substantially at top dead center position 110, in order to allow a flame front to propagate.

Pilot quantity of fuel 120 and main quantity of fuel 134 may auto-ignite at top dead center position 110, expanding working fluid 116 and driving piston 108 back down to bottom dead center position 112. In one embodiment, a volume of pilot quantity of fuel 120 is substantially equal to 35% of a volume of main quantity of fuel 134.

Since pilot quantity of fuel 120 and main quantity of fuel 134 may auto-ignite upon the entry of main quantity of fuel 134 into combustion chamber 104, however, main quantity of fuel 134 may have no time to disperse. Main quantity of fuel 134 may thus be concentrated when it burns.

If main quantity of fuel 134 is concentrated, it may support higher combustion temperatures. Injecting main quantity of fuel 134 into combustion chamber 104 when piston 108 is at top dead center position 110 may thus negate the effect of dispersion on combustion temperatures, and raise the temperature in combustion chamber 104 high enough to oxidize nitrogen in working fluid 116. CO and $H_2O$ leftover from the cool flame combustion however, may ameliorate some of the effects of fuel concentration.

In one embodiment, the volume of main quantity of fuel 134 is minimized to ameliorate the effects of fuel concentration. If pilot quantity of fuel 120 is substantially equal to the maximum amount of fuel that will not auto-ignite, the volume of main quantity of fuel 134 need only be large enough to add enough fuel to produce auto-ignition. Thus, main quantity of fuel 134 need not be large enough to promote high combustion temperatures or excessive oxidation of nitrogen in its own right. In another embodiment, the volume of main quantity of fuel 134 is substantially greater than the volume necessary to produce auto-ignition.

In one embodiment, pilot quantity of fuel 120 is substantially a maximum quantity that will not auto-ignite when working fluid 116 and pilot quantity of fuel 120 are compressed. In this embodiment, the maximum amount of fuel that will not auto-ignite is targeted. In one embodiment, the maximum amount of fuel that will not auto-ignite is expressed as an equivalence ratio between the ratio of the volume of pilot quantity of fuel 120 to the volume of working fluid 116 and the stoichiometric ratio. In any case, since the volume of working fluid 116 appears in the denominator of the stoichiometric ratio as well, the equivalence ratio condenses to a ratio of the volume of pilot quantity of fuel 120 to the volume of fuel at stoichiometric.

In one embodiment, a target equivalence ratio for a volume of pilot quantity of fuel 120 may be about 0.1. That is, the ratio of the volume of pilot quantity of fuel 120 to the volume of working fluid 116 may be about one-tenth the size of the stoichiometric ratio. This equivalence ratio may maximize the amount of CO produced during cool flame combustion. In the case of a 12 liter heavy duty engine running at about its rated RPM, the volume of pilot quantity of fuel 120 may be sufficient to deliver 0.004 kg/s or less, depending on the engine load.

In one embodiment, a mass flow sensor 146 may be disposed in a flow of working fluid 116 to measure a rate of flow of working fluid 116. In one embodiment, mass flow sensor 146 may be placed in an intake plenum. In another embodiment, shown in FIGS. 1 and 2, mass flow sensor 146 may be placed in intake runner 114.

In one embodiment, mass flow sensor 146 may include a resistor placed across a flow of working fluid 116. If a current is applied to the resistor, heat generated by the resistance may be convected away from the resistor by working fluid 116.

The amount of heat convected away from the resistor may be estimated by measuring the temperature drop across the resistor.

Since the amount of heat convected away from the resistor may be generally in proportion to a volumetric or mass flow rate of working fluid 116, the mass flow rate of working fluid 116 can be estimated from the temperature drop. If the stoichiometric ratio of the fuel used with working fluid 116 is known, the volume of pilot quantity of fuel 120 needed to produce the desired equivalence ratio can be calculated from the mass flow rate of working fluid 116.

In one embodiment, equivalence ratios for various loads, engine speeds, ambient temperatures, atmospheric pressures, or humidity can be calculated and stored in a look-up table. An abscissa of the lookup table may be a range of mass flow rates of working fluid 116, while an ordinate of the lookup table may be the corresponding equivalence ratios.

Figure 3:
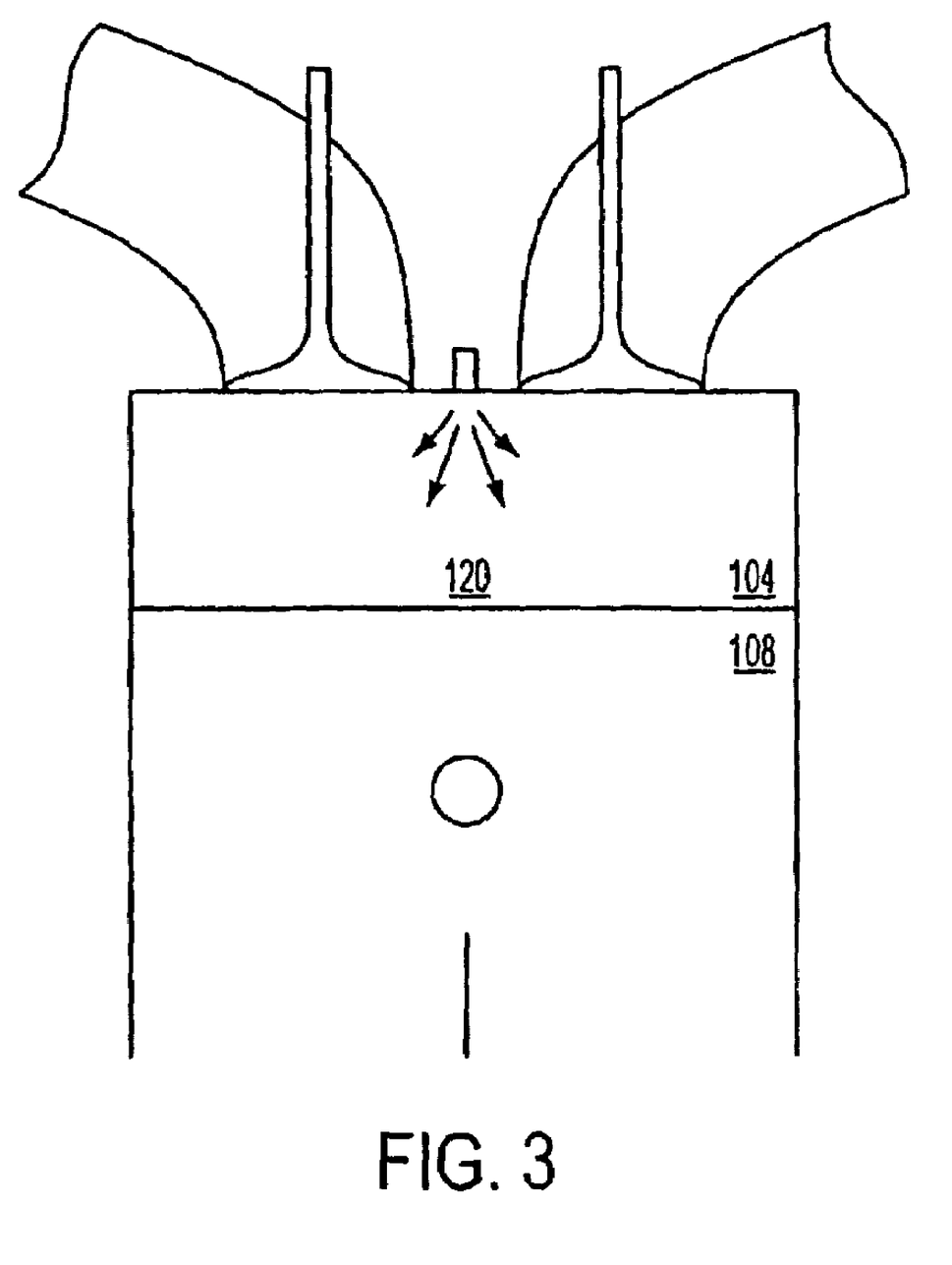
FIG. 3 is emission control for an internal combustion engine according to a second embodiment of the invention.

In a second embodiment, shown in FIG. 3, a fuel injector 122 may be disposed in cylinder 102 head to admit fuel to combustion chamber 104. In one embodiment, fuel injector 122 admits pilot quantity of fuel 120 to combustion chamber 104. In another embodiment, fuel injector 122 admits main quantity of fuel 134 to combustion chamber 104.

Figure 4:
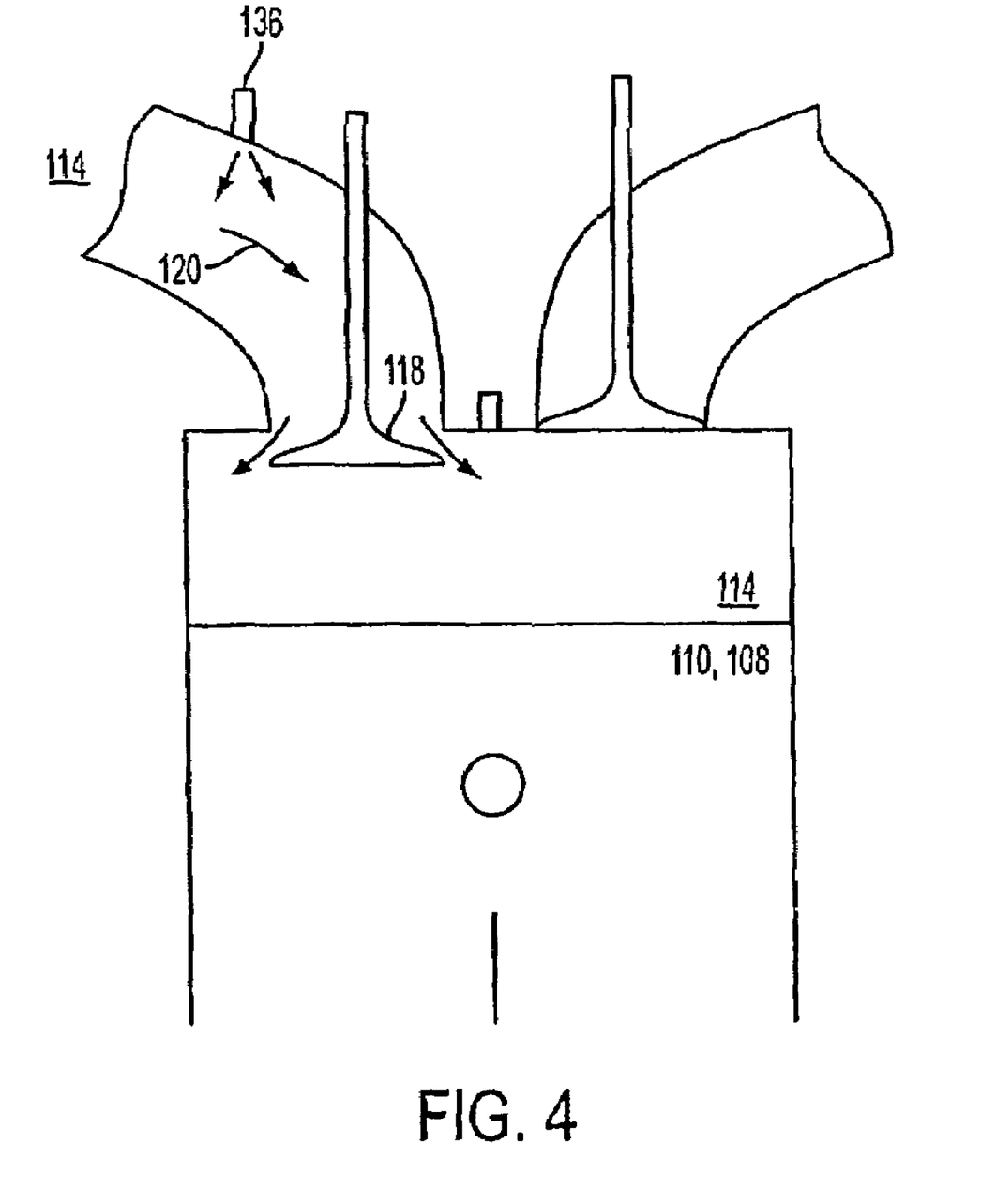
FIG. 4 is emission control for an internal combustion engine according to a third embodiment of the invention.

In a third embodiment, shown in FIG. 4, a fuel injector 136 may be disposed in intake runner 114. In this embodiment, fuel injector 136 may provide pilot quantity of fuel 120 to combustion chamber 104 when intake valve 118 is substantially open and piston 108 moves from top dead center position 110 to bottom dead center position 112. In one embodiment, pilot quantity of fuel 120 may be injected into intake runner 114.

Figure 5:
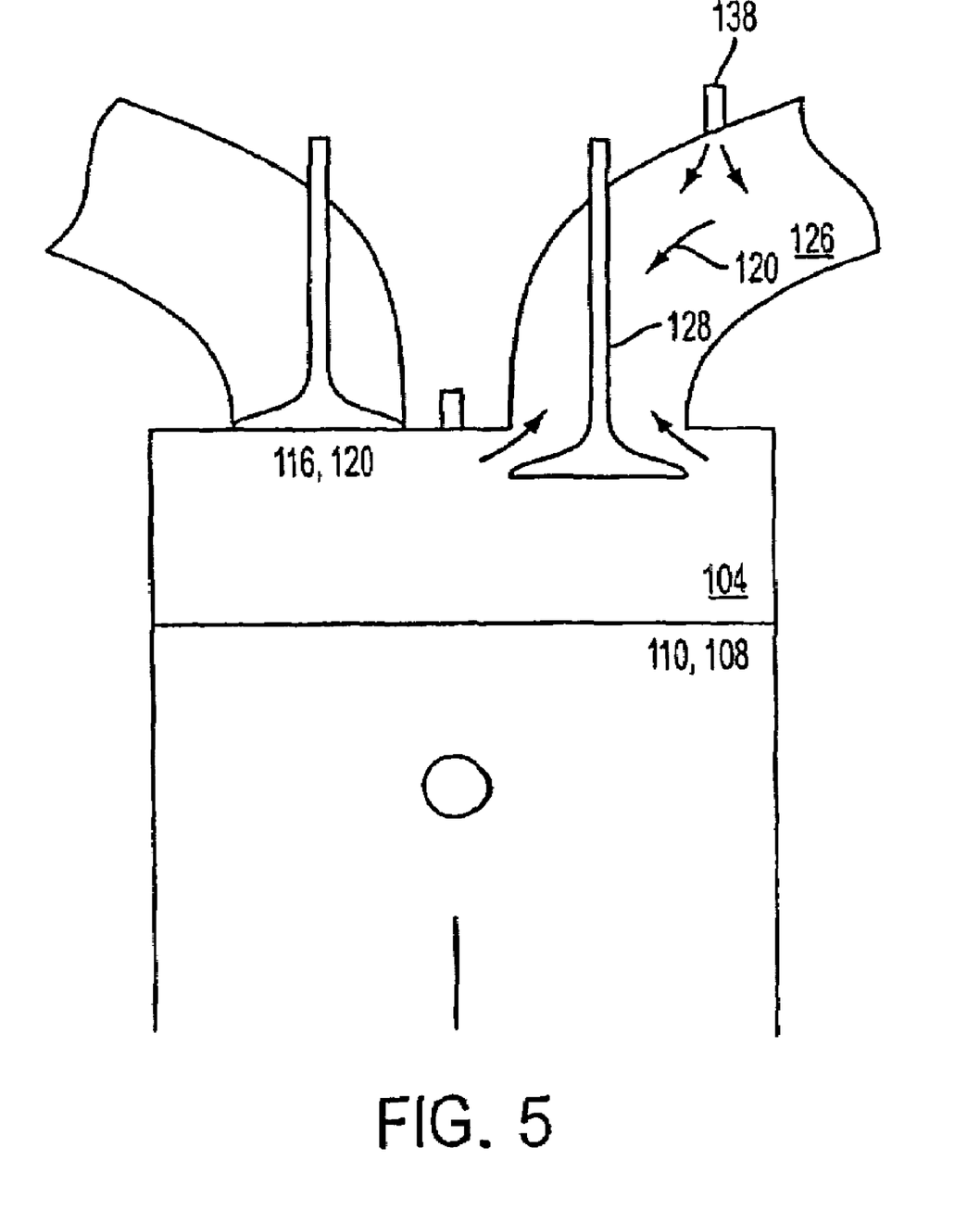
FIG. 5 is emission control for an internal combustion engine according to a fourth embodiment of the invention.

In a fourth embodiment, shown in FIG. 5, an exhaust runner 126 may be connected communicably to combustion chamber 104 via an exhaust valve 128. In this embodiment, combustion chamber 104 may exhaust working fluid 116 and pilot quantity of fuel 120 to exhaust runner 126 when exhaust valve 128 is substantially open and piston 108 moves from bottom dead center position 112 to top dead center position 110.

In one embodiment, a fuel injector 138 may be disposed in exhaust runner 126. In this embodiment, fuel injector 138 may provide pilot quantity of fuel 120 to combustion chamber 104 when exhaust valve 128 is substantially open and piston 108 moves from top dead center position 110 to bottom dead center position 112. In one embodiment, pilot quantity of fuel 120 may be injected into exhaust runner 126.

In a fifth embodiment, cylinder assembly 100 also includes a transducer 140 for monitoring a sound power distribution 142 emanating from combustion chamber 104. In one embodiment, transducer 140 may be a piezoelectric element, such as an accelerometer. In another embodiment, transducer 140 is a knock sensor.

Figure 6A:
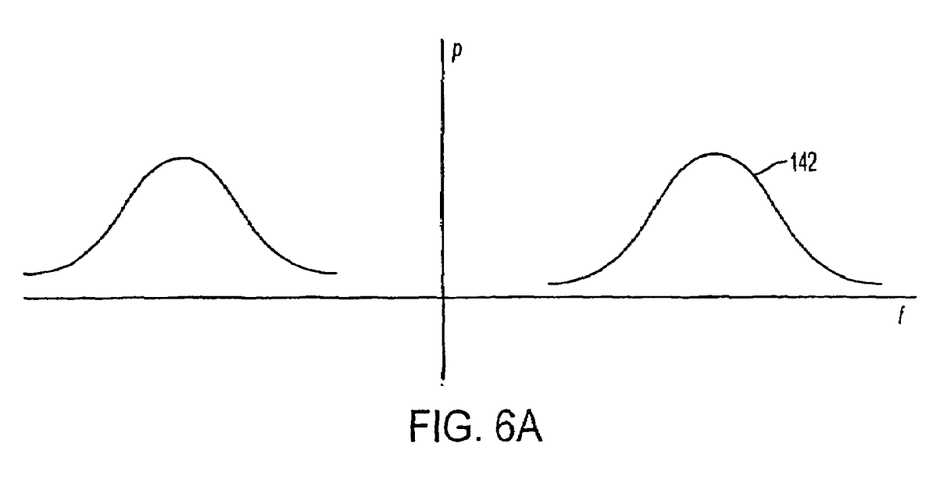
FIGS. 6A and 6B shows sound power distributions for use with an embodiment of the invention.
Figure 6B:
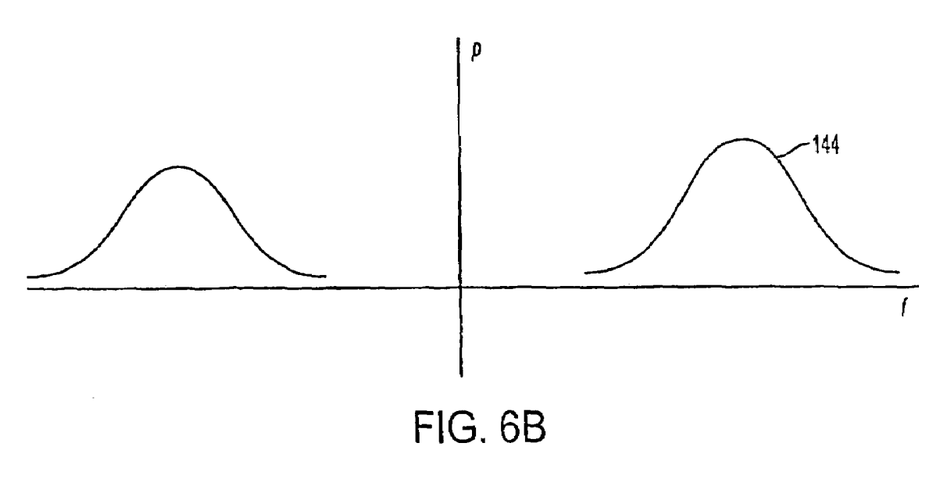

Sound power distribution 142 may be analogous to a pressure in cylinder 142, such as a range of pressures across a frequency spectrum, or a pressure differential, such a pressure rise. In several alternative embodiments, sound power distribution 142 may be a distribution of sound pressure or sound power, acceleration, or amplitude of displacement, such as amplitude of vibration across a range of frequencies of vibration, as shown in FIG. 6.

In one embodiment, a sound power distribution 144 that is substantially characteristic of auto-ignition or predetonation is determined for a location of transducer 140. Sound power distribution 144 may be analogous to a predetermined pressure in cylinder 142, such as a predetermined range of pressures or a pressure rise known to be associated substantially with the onset of auto-ignition.

Sound power distribution 142 emanating or radiating from combustion chamber 104 at the location of transducer 140 during compression may then compared with sound power distribution 144. If sound power distribution 142 matches substantially sound power distribution 144 before piston 108 is substantially at top dead center position 110, auto-ignition may have begun prematurely.

In one embodiment, if auto-ignition begins prematurely, a time at which main quantity of fuel 134 is injected may be retarded to delay the onset of auto-ignition. In another embodiment, a volume of pilot quantity of fuel 120 may be reduced to substantially prevent the onset of auto-ignition until main quantity of fuel 134 is injected.

In one embodiment, a volume of pilot quantity of fuel 120 may be increased until sound power distribution 142 matches substantially sound power distribution 144, indicating the onset of auto-ignition, and then reduced slightly. In this embodiment, a volume of pilot quantity of fuel 120 may be made substantially equal to a maximum volume that will not auto-ignite when working fluid 116 and pilot quantity of fuel 120 have been compressed over a range of operating conditions.

Transducer 140 may monitor sound power distribution 142 directly, or through a proxy such as a head bolt strain or a vibration signature near combustion chamber 104. In one embodiment, transducer 140 exhibits a substantially constant response to pre-detonation. In this embodiment, the predetermined pressure may be a response matched to the known response.

In several embodiments, combustion may be controlled by admitting water to cylinder 102, admitting exhaust gas to cylinder 102, reducing an $O_2$ concentration in working fluid 116, varying a compression ratio of cylinder 102, adjusting a temperature or pressure in cylinder 102 during compression, varying a timing of opening intake valve 118 or exhaust valve 128, and modifying a molecular structure of pilot quantity of fuel 120 or main quantity of fuel 134, such as by providing longer and more linear molecules to promote isomerization.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An emission control for an internal combustion engine comprising:
    a cylinder having a combustion chamber at an end thereof;
    a piston disposed slidably within said cylinder, said piston having a bottom dead center position distal from said combustion chamber and a top dead center position proximate to said combustion chamber;
    a pilot quantity of fuel disposed substantially dispersably within said cylinder;
    a working fluid disposed compressably within said cylinder, said piston compressing said working fluid and said pilot quantity of fuel as it slides from said bottom dead center position to said top dead center position; and
    wherein said pilot quantity of fuel is substantially a maximum quantity that will not support auto-ignition when said working fluid and said pilot quantity of fuel have been compressed.

2. The emission control for an internal combustion engine of claim 1, comprising further a fuel injector disposed to admit said pilot quantity of fuel to said combustion chamber.

3. The emission control for an internal combustion engine of claim 1, comprising further an intake runner connected communicably to said combustion chamber via an intake valve, said intake runner providing said working fluid to said combustion chamber when said intake valve is substantially open and said piston moves from said top dead center position to said bottom dead center position.

4. The emission control for an internal combustion engine of claim 3, comprising further a fuel injector disposed in said intake runner, said fuel injector providing said pilot quantity of fuel to said combustion chamber when said intake valve is substantially open and said piston moves from said top dead center position to said bottom dead center position.

5. The emission control for an internal combustion engine of claim 3, comprising further a mass air flow sensor disposed in said intake runner, said mass air flow sensor calculating a rate of flow of said working fluid, and
wherein said pilot quantity of fuel is correlated to an equivalence ratio based on said rate of flow.

6. The emission control for an internal combustion engine of claim 1, comprising further an exhaust runner connected communicably to said combustion chamber via an exhaust valve, said combustion chamber exhausting said working fluid and said pilot quantity of fuel to said exhaust runner when said exhaust valve is substantially open and said piston moves from said bottom dead center position to said top dead center position.

7. The emission control for an internal combustion engine of claim 6, comprising further a fuel injector disposed in said exhaust runner, said fuel injector providing said pilot quantity of fuel to said combustion chamber when said exhaust valve is substantially open and said piston moves from said top dead center position to said bottom dead center position.

8. The emission control for an internal combustion engine of claim 1, comprising further:
a transducer monitoring a pressure in said combustion chamber; and
wherein said pilot quantity of fuel is reduced if said pressure is greater than a predetermined pressure.

9. The emission control for an internal combustion engine of claim 8, wherein said predetermined pressure indicates an onset of combustion.

10. The emission control for an internal combustion engine of claim 1, comprising further:
a transducer monitoring a pressure in said combustion chamber; and
wherein injection of a main quantity of fuel is retarded if said pressure is greater than a predetermined pressure.

11. The emission control for an internal combustion engine of claim 10, wherein said predetermined pressure indicates an onset of combustion.

12. The emission control for an internal combustion engine of claim 1, comprising further a combustion control selected from the group consisting of:
admitting water to said cylinder,
admitting exhaust gas to said cylinder,
reducing an $O_2$ concentration in said working fluid,
varying a compression ratio of said cylinder,
adjusting a temperature in said cylinder during compression,
adjusting a pressure in said cylinder during compression,
varying a timing of an opening of an intake valve,
varying a timing of an opening of an exhaust valve, and
modifying a molecular structure of said pilot quantity of fuel.

13. A method of emission control for an internal combustion engine comprising:
transferring a working fluid to a cylinder;
dispersing a maximum pilot quantity of fuel that will not support auto-ignition when said working fluid and said pilot quantity of fuel have been compressed in said cylinder; and
compressing said working fluid and said pilot quantity of fuel.

14. The method of emission control for an internal combustion engine of claim 13, comprising further:
providing a combustion chamber at an end of said cylinder; and
injecting said pilot quantity of fuel into said combustion chamber.

15. The method of emission control for an internal combustion engine of claim 13, comprising further:
providing a combustion chamber at an end of said cylinder; and
providing said working fluid to said cylinder through an intake runner connected communicably to said combustion chamber via an intake valve.

16. The method of emission control for an internal combustion engine of claim 15, comprising further:
injecting said pilot quantity of fuel into said intake runner.

17. The method of emission control for an internal combustion engine of claim 13, comprising further:
providing a combustion chamber at an end of said cylinder; and
exhausting said working fluid and said pilot quantity of fuel from said combustion chamber through an exhaust runner connected communicably to said combustion chamber via an exhaust valve.

18. The method of emission control for an internal combustion engine of claim 17, comprising further:
injecting said pilot quantity of fuel into said exhaust runner.

19. The method of emission control for an internal combustion engine of claim 13, comprising further:
measuring a rate of flow of said working fluid; and
correlating said pilot quantity of fuel to an equivalence ratio based on said rate of flow.

20. The method of emission control for an internal combustion engine of claim 13, comprising further:
monitoring a pressure in said cylinder; and
reducing said pilot quantity of fuel if said pressure is greater than a predetermined pressure.

21. The method of emission control for an internal combustion engine of claim 13, comprising further:
monitoring a pressure in said cylinder; and
retarding an injection of a main quantity of fuel if said pressure is greater than a predetermined pressure.

22. The method of emission control for an internal combustion engine of claim 13, comprising further a combustion control selected from the group consisting of:
admitting water to said cylinder,
admitting exhaust gas to said cylinder,
reducing an $O_2$ concentration in said working fluid,
varying a compression ratio of said cylinder,
adjusting a temperature in said cylinder during compression,
adjusting a pressure in said cylinder during compression,
varying a timing of an opening of an intake valve,
varying a timing of an opening of an exhaust valve, and
modifying a molecular structure of said pilot quantity of fuel.

23. A system of emission control for an internal combustion engine comprising:
means for transferring a working fluid to a cylinder;

means for dispersing a maximum pilot quantity of fuel that will not support auto-ignition when said working fluid and said pilot quantity of fuel have been compressed in said cylinder; and means for compressing said working fluid and said pilot quantity of fuel.

* * * * *